Figure 1:
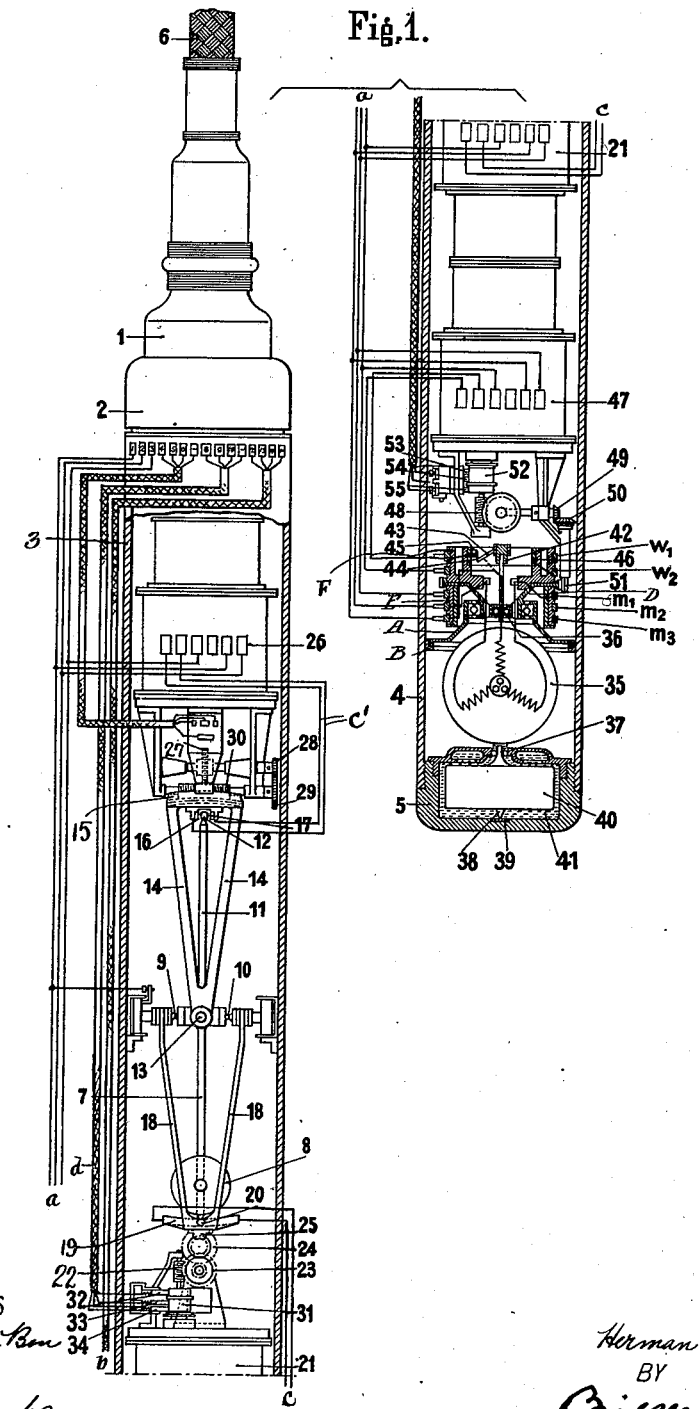

H. ANSCHUTZ-KAEMPFE.
APPARATUS FOR DETERMINING DEVIATION OF BORE HOLES FROM THE VERTICAL.
APPLICATION FILED DEC. 14, 1912.

1,209,102.

Patented Dec. 19, 1916.
2 SHEETS—SHEET 1.

WITNESSES

INVENTOR
Herman Anschütz-Kaempfe
BY
ATTORNEYS

APPARATUS FOR DETERMINING DEVIATION OF BORE HOLES FROM THE VERTICAL.
APPLICATION FILED DEC. 14, 1912.

1,209,102.
Patented Dec. 19, 1916.
2 SHEETS—SHEET 2.

WITNESSES
George Du Bois
Louis Alexander

INVENTOR
Herman Anschütz-Kaempfe
BY
Briesen & Knauth
ATTORNEYS

UNITED STATES PATENT OFFICE.

HERMANN ANSCHÜTZ-KAEMPFE, OF NEUMÜHLEN, NEAR KIEL, GERMANY.

APPARATUS FOR DETERMINING DEVIATION OF BORE-HOLES FROM THE VERTICAL.

1,209,102.          Specification of Letters Patent.      Patented Dec. 19, 1916.

Application filed December 14, 1912. Serial No. 736,667.

*To all whom it may concern:*

Be it known that I, Dr. HERMANN ANSCHÜTZ-KAEMPFE, a subject of the Emperor of Germany, and a resident of Neumühlen, near Kiel, Germany, have invented certain new and useful Improvements in Apparatus for Determining Deviations of Bore-Holes from the Vertical, of which the following is a specification.

Many kinds of apparatus have been constructed for determining deviation of bore holes from the vertical all of which are based on the use of a pendulum, of a water level or of another arrangement influenced by gravity. Any turning of the apparatus about its longitudinal axis, relatively to its original position, has to be recorded simultaneously with the different positions of the pendulum, as only by taking into account these two measurements, is it possible to get a clear idea of the course of the bore hole. Various means have been suggested for measuring the turning, such as systems of one or more gyroscopes with three degrees of freedom, magnetic needles and the like. All the apparatus hitherto used have, however, the feature in common that the measurements are recorded within the apparatus itself, whether by a photographic process, by writing pens or the like. This is attended however by several disadvantages.

The recording apparatus must be charged afresh before every measurement, for which purpose the apparatus, which must be water-tight under very high pressures, has to be opened; moreover, it is impossible to ascertain before the end of the operation, whether all the parts have acted properly. Finally, the bore hole must be measured throughout the whole of its extent with the same care and the same loss of time, whether there be a deviation from the vertical or not. These disadvantages are avoided by the present invention. According to this invention, the plumb apparatus proper is formed into a transmitter which operates by electricity or in some other way; a receiver arranged outside the bore hole, on which the results of the measurements can be continuously read or if necessary recorded. In that way, the transmitter can be utilized during a long period for measurements, without its being necessary to open it in the meantime, and moreover the proper working is continuously checked by the receiver. Finally, the single portions of the bore hole presenting greater irregularities, can be examined with special care, while regular portions can be worked without loss of time.

The construction hereinafter described, is intended to show how the object of the invention can be attained, but of course other arrangements could be made.

Figure 2:
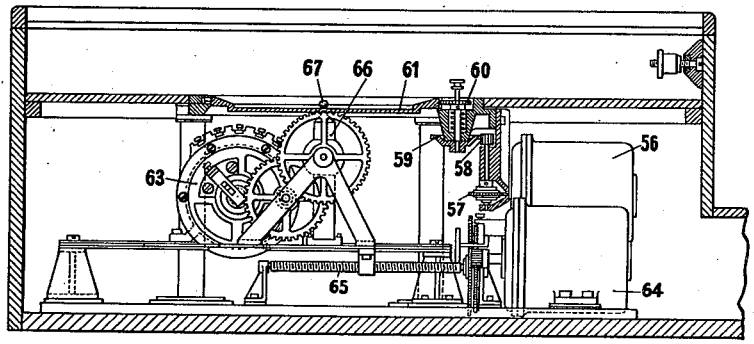
Figure 3:
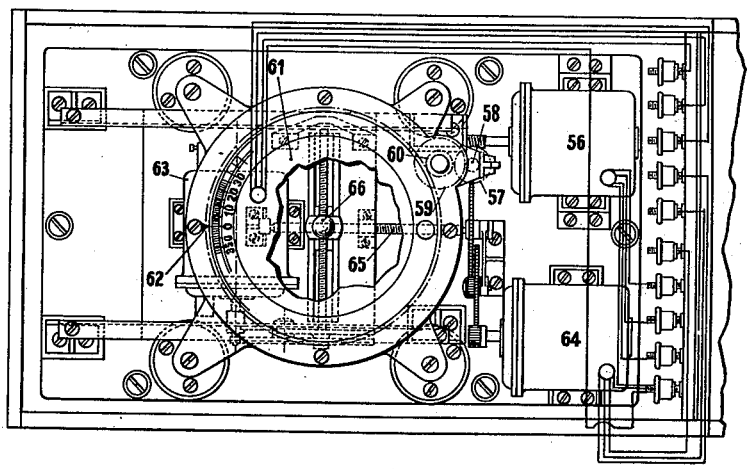
Figure 4:
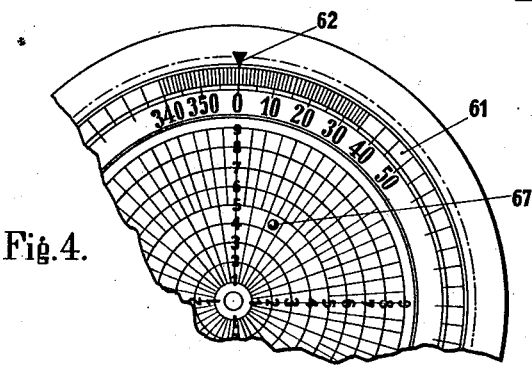

Figure 1 shows the transmitter apparatus in cross-section, Figs. 2 and 3 show the receiver in side elevation and in plan, while Fig. 4 shows a fragmentary view of the dial of the indicator apparatus of the receiver.

In Fig. 1, 1 to 5 indicate the single parts of the generally cylindrical pressure-resisting casing of the transmitter, screwed into each other. To the said transmitter is secured the cable 6 with the necessary conducting cores. For measuring the inclinations of the transmitter, and therefore of the bore holes, the pendulum 7 is used, which carries at its lower end a weight 8 and is suspended in a well known manner by means of gimbal bearings 9, 10 and 13. For the sake of making the drawing clearer, the bearing system is only partially reproduced. The pendulum is extended upward and carries on a rod 11 a contact ball 12. Pivotally mounted about the suspension point 13 of the pendulum is the bracket 14 which however cannot move freely in every direction, but can only oscillate about the pin 13 within the plane of the paper. It carries in its upper part 15 two contact surfaces 16 and 17 arranged at a right angle to the plane of the paper. The contact surfaces inclose between them the ball 12, so that the latter can move between them only with a slight amount of play. In the same way as the bracket 14, the bracket 18 is pivotally mounted in the plane of the paper and extends downward from the suspension points 9 and 10 so that it can move only at a right angle to the plane of the paper. It carries at its lower end 19 two contact surfaces, not shown, between which moves with a small play the contact ball 20 of the pendulum, shown dotted.

The contact surfaces of the lower bracket 18 are arranged so that the pendulum can oscillate within the plane of the paper, without the contact ball 20 closing the circuit through them, while every movement of the pendulum out of the plane of the paper results in a circuit being closed at one or the other of these contact surfaces. But the contact surfaces arranged at 19 are so connected to a reversible motor 21 by connections $c$ that the latter, by means of a driving worm 22, gear wheels 23, 24 and a driving worm secured to the wheel 24, always turns the bracket 18 provided with teeth at 25, in accordance with the position of the pendulum, until the circuit of the contact ball 20 is again broken. In the same way when the pendulum oscillates in the plane of the paper in one or in the other direction, the reversible motor 26 receives current by connections $c'$ through the upper contact ball 12, whereupon, by means of the driving gear 27, gear wheels 28, 29 and worm 30, it turns the bracket 14 to suit the positions of the pendulum. The result of that arrangement is therefore that the bracket 14 reproduces the angle formed by the projection of the pendulum on to the plane of the paper, with the vertical, while the bracket 18 repeats the projection on to a plane at a right angle to the plane of the paper.

The reversible motor 21 is connected to a subdivided commutator or collector 31, which sends the necessary current impulses by means of the contact brushes 32, 33 and 34, and an intermediate cable $d$ through the cable 6, to a synchronizing device of the transmitter outside the shaft; this commutator and other necessary intermediate means for suitably transmitting the necessary current impulses from a reversible motor to the synchronizing device is the same as is fully set forth in my Patent No. 1,069,842 dated August 12, 1913, entitled device for recording the paths of ships. A similar device is provided on the reversible motor 26. It is therefore possible by means of this synchronizing device always to reproduce outside the bore hole the position of the two brackets 14 and 18, and therefore also the position of the pendulum itself. This consideration is, however, correct only as long as the rotations of the whole apparatus about the vertical axis are neglected. In order to enable the latter rotation also to be observed outside the bore hole, a high speed gyroscope compass is arranged within the closed casing 35. The weight of the gyroscope compass rests partially on a hardened point 38 and the hardened plate 39, but the major portion thereof is supported by the buoyancy of a float 40 within a mercury bath 41. The casing, and with it the gyroscope compass, can rotate in the ball bearings 36 and 37 about a vertical axis. The gyroscope compass mounted in the casing 35, has thus two degrees of freedom, and will therefore execute in the known manner oscillations about the north-south-line, which are damped by the friction in the bearings 36 and 37 and in the liquid 41, so that the axis of the gyroscope compass will finally come to rest in the meridian. The vertical spindle of the gyroscope compass carries at its upper end a sleeve 42 and on the same an arm 43 to which is secured by means of a fine spring 44 a contact ball 45. This ball 45 is slidably in contact with two metallic half rings mounted upon the inner surface of an upper drum F of insulating material. The half rings do not quite cover 180° of arc so that there is a certain length of insulation between their ends. A pair of collecting rings $w_1$ and $w_2$ are mounted one above the other on the outside of drum F. A lower drum E, also of insulating material, carries a group of collecting rings $m_1$, $m_2$ and $m_3$.

The two drums E and F are fixed upon a member D rotatably mounted in a bearing A which is fastened at B to the interior of the casing. The member D is pierced centrally so as to constitute a bearing for the upper spindle of the gyroscope compass.

The member D is provided with an annular rack by means of which it may be rotated by the reversible motor 47 through the worm gear 48, bevel gears 49 and 50 and pinion 51.

The contact rings $w_1$ and $w_2$ are connected respectively with the half rings 46 and contact brushes which rest upon these collecting rings $w_1$ and $w_2$, are suitably connected to the motor 47.

Contact brushes fixed to the casing are also provided for the three collecting rings $m_1$, $m_2$ and $m_3$, with which they are slidably engaged. Through these brushes and rings the several phases of the three phase current are carried to the gyroscope motor, one phase going by way of the gyroscope spindle.

In operation, the motor 47 is generally at rest with the mounting D and rings 46 in such position that the contact ball 45 rests upon insulating material between the rings. Should the casing rotate in either direction the contact ball 45 will make contact with one or the other of rings 46 since the gyroscope axis will remain constantly parallel to itself. A phase of the current will then pass by way of ball 45, ring 46 and a contact ring $w_1$ or $w_2$ to the reversible motor causing it to turn in one direction or the other and to rotate the mounting D until the insulating material between the ends of rings 46 again lies under ball 45 so as to stop the motor.

The above described arrangement of reversible motor arranged to automatically rotate a pair of split rings 46 is substantially the same as that disclosed in my United States Patent, dated September 9, 1910, Number 1,092,816.

The reversible motor 47 is also provided at 52 with a suitably shaped collector for the brushes 53, 54 and 55 which also send current impulses through the cable 6 to the synchronizing device of the receiver.

Figs. 2 and 3 show the receiver apparatus. The receiver motor of the synchronizing device of the contact half rings 46 is marked 56. This motor drives, by means of a worm, the gear wheels 57, 58, 59, 60 and in that way the compass card 61. The rate of transmission is calculated so that the card 61 always reproduces the position, at the moment, of the gyroscope compass 35 relatively to the transmitter, namely the angular movements relatively to the initial position are read opposite the mark 62. The current impulses which the reversible motors 21 and 26 send into the conductor when the pendulum deviates from the vertical, arrive at the motors 63 and 64 of the receiver. As will be seen from Figs. 2 and 3, the motor 64 according to the direction of its movement, moves a slide to and fro by means of a wheel gear and a worm 65. The motor 63 is secured to the said slide and therefore takes part in its motion. It moves by means of a suitable wheel gear the permanent magnet 66 transversely of the direction of movement of the slide. Owing to this composition of the movements of the motors 63 and 64, the position of the permanent magnet 66 pointed at the top, always reproduces the position of the pendulum in the transmitter apparatus. The position of the magnet 66 is read off above the opaque card 61 by means of a small iron ball 67 placed on the same and following the movements of the magnet 66 owing to magnetic attraction.

The working of the whole apparatus will be readily understood from the foregoing.

The position of the magnet and therefore of the ball 67, clearly shows at any time the inclination with respect to the transmitter, while the angle of rotation of the card corresponds with the angle of rotation at the same time of the transmitter apparatus. By reading therefore the position of the ball relatively to the card, the position of the pendulum relatively to the bore hole will be obtained. By the expression "turning devices", as used in the claims, I mean the motors 26 and 21 and associated mechanism considered collectively as a means for transmitting and following up the movement of the pendulum as resolved in two perpendicular planes. And in speaking of the gyroscope compass I employ the expression to indicate the motor 47 and associated mechanism considered collectively as a means for transmitting and following up the rotation of the compass about a vertical axis.

What I claim is:—

1. In a device for determining the deviations of bore holes from the vertical, the combination with a casing adapted to be lowered into the bore hole, of a pendulum and a compass therein, turning devices operatively connected with the pendulum and the compass and respectively controlled thereby, an indicating device outside of and separate from said casing, and synchronizing devices for transmitting the movements of the turning devices to the indicating device.

2. In a device for determining the deviations of bore holes from the vertical, the combination with a casing adapted to be lowered into the bore hole, of a pendulum and a compass therein, two frames pivoted about two axes at right angles to each other, means whereby the components of the respective movements of the pendulum about said two axes, are transmitted to the said frames, an indicating device, and electrical means for transmitting the respective movements of the said frames to the indicating device.

3. In a device for determining the deviations of bore holes from the vertical, the combination with a casing adapted to be lowered into the bore holes, of a pendulum and a compass therein, turning devices operatively connected with the pendulum and the compass and respectively controlled thereby, an indicating device having a rotatable dial, an indicator movable over said dial, electric means for transmitting the respective movements of the turning devices to the indicator, and electric means for transmitting the respective movements of the compass to the rotatable dial.

4. In a device for determining the deviations of bore holes from the vertical, the combination with a casing adapted to be lowered into the bore hole, of a pendulum and a compass therein, two frames pivoted about two axes at right angles to each other, means whereby the components of the respective movements of the pendulum about said two axes, are transmitted to the said frames, an indicating device having a rotatable dial, an indicator movable over said dial, electric means for transmitting the respective movements of the frames to the indicator, and electric means for transmitting the respective movements of the compass to the rotatable dial.

5. In a device for determining the deviations of bore holes from the vertical, the combination with a casing adapted to be lowered into the bore hole, of a pendulum and a compass therein, turning devices operatively connected with the pendulum and the compass and respectively controlled thereby, an indicating device having a rotatable dial, a magnetic bar movable beneath said dial, an iron ball on said dial adapted to be attracted by and to follow the movements of the magnetic bar, electric means for transmitting the respective movements of the turning devices to the indicator, and electric means for transmitting the respective movements of the compass to the rotatable dial.

In witness whereof I have hereunto signed my name this 29th day of November, 1912, in the presence of two subscribing witnesses.

DR. HERMANN ANSCHÜTZ-KAEMPFE.

Witnesses:
KURT VON MAYTHAUSEN,
WOLFGANG OTTO.